UNITED STATES PATENT OFFICE.

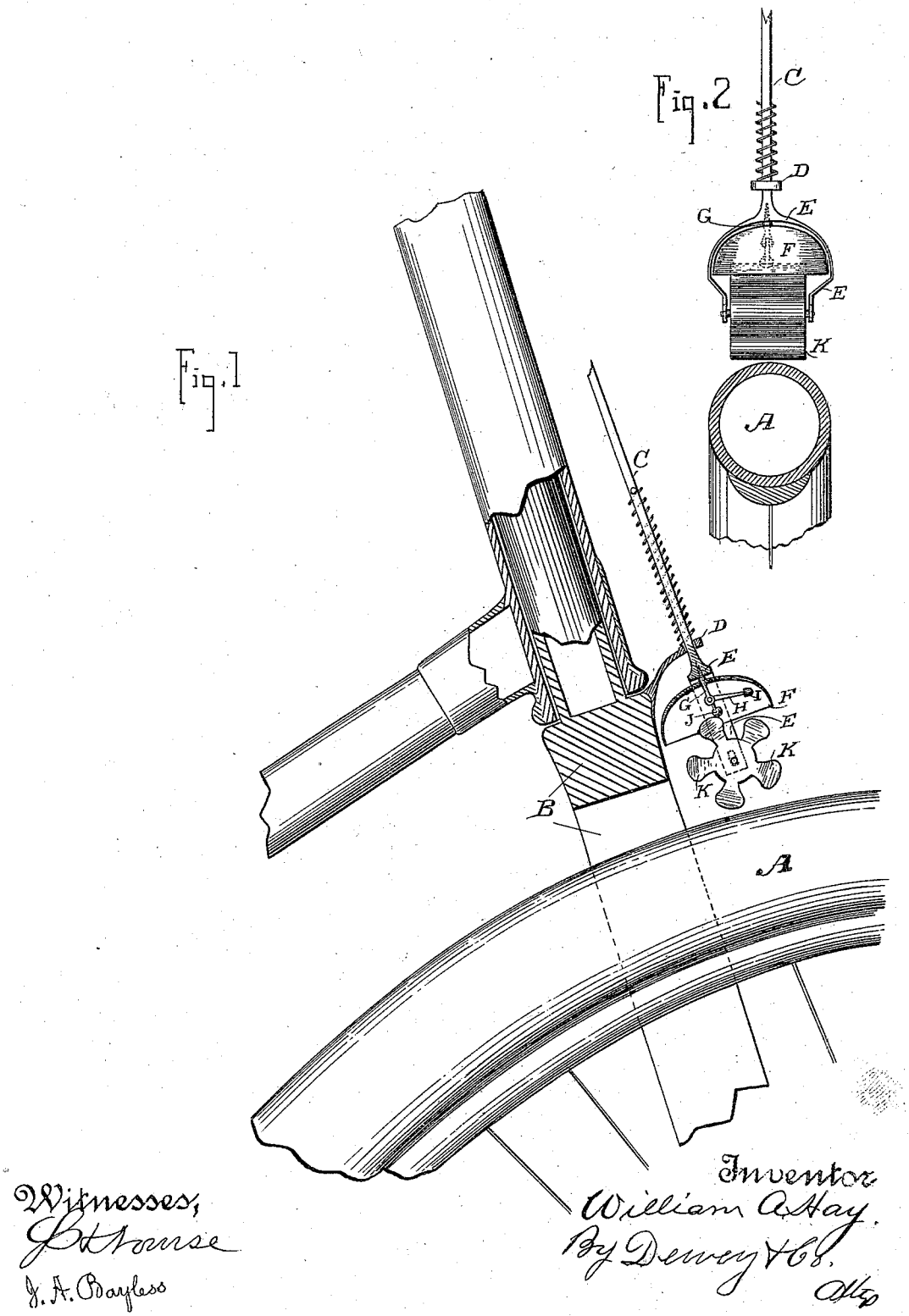

WILLIAM A. HAY, OF SAN FRANCISCO, CALIFORNIA.

BICYCLE-BELL-ACTUATING BRAKE.

SPECIFICATION forming part of Letters Patent No. 550,718, dated December 3, 1895.

Application filed August 16, 1895. Serial No. 559,539. (No model.)

*To all whom it may concern:*

Be it known that I, WILLIAM A. HAY, a citizen of the United States, residing in the city and county of San Francisco, State of California, have invented an Improvement in Bicycle Bells and Brakes; and I hereby declare the following to be a full, clear, and exact description of the same.

My invention relates to a bell which is especially adapted for use upon bicycles and a mechanism, acting by contact with the wheel, whereby the bell may be sounded.

It consists in certain details of construction, which will be more fully explained by reference to the accompanying drawings, in which—

Figure 1 is a view of a portion of the bicycle frame and wheel, showing my attachment. Fig. 2 is a front view of the attachment.

The object of my invention is to provide a bell for use upon bicycles and means by which it may be easily sounded or the sound arrested.

A represents the tire of a bicycle-wheel, turning in forks B of a frame constructed in any well-known manner.

C is a plunger-rod, such as is usually employed to operate the brake by means of a lever attached to the handle-bar of the machine. This plunger-rod is slidable through a guiding-plate D, and its lower end has fixed to it a bifurcated yoke or frame E. Within this frame is secured the bell or sounder F. In the present case I have shown the bell secured in the fork of the frame by means of a screw shank or stem G, which passes up through the center of the bell and enters the crown of the fork, having a suitable shoulder by which the bell is clamped in place within the fork-crown E. The lower end of this shank G forms a fulcrum-point for a bell-crank lever H, upon one end of which is a hammer or striker I, adapted to strike the side of the bell when the device is operated. The other arm has a weighted enlargement J, which normally holds it in a depressed position, the arm being thus suspended on its fulcrum-point, so that the hammer is out of contact with the bell.

In the lower end of the fork E is journaled a wheel having one or more arms K. The shaft of this wheel turns in slots in the ends of the fork, so that it may slide up and down, being normally held down in the bottom of the slot by gravitation or by a spring. The arms K are of such a length as to be brought into contact with the periphery of the wheel rim or tire A whenever the plunger-rod C is depressed by action of the brake-lever, this depression of the plunger-rod also moving the yoke or fork E and carrying down with it the wheel until the latter comes in contact with the tire. The rapid rotation of the tire then causes the wheel to revolve and the arm or arms K carried by it will strike the knob or projection J. This action upon the knob causes the lever H to tilt and the hammer to strike against the bell with great rapidity, thus producing a continuous sound as long as the parts remain depressed.

The device may also be made to form a brake by a further depression of the plunger until the wheel is pressed against the tire, so as to gradually prevent its revolving, this occurring by reason of the space between the arms K and their peculiar shape, which, while allowing them to revolve by a light contact with the tire, will, when they are pressed strongly against the tire, prevent their revolving, and the device will then serve directly as a brake.

By this construction the bell may be sounded at any time by a light touch upon the brake-lever, and if it be found necessary to afterward or at any time apply the brake it is done by pressing the arms down strongly against the tire until they lock and stop rotating, when their frictional action will be precisely the same as that of any other frictional brake.

Having thus described my invention, what I claim as new, and desire to secure by Letters Patent, is—

1. A bell and brake attachment for bicycles comprising a slidable rod having a yoke-shaped lower end, a bell fixed within said yoke and provided with a hammer and a wheel mounted in said yoke below the bell, having arms adapted to operate the hammer of the bell when said wheel is forced into contact with the tire or rim of the bicycle.

2. A bicycle bell and brake consisting of a plunger rod slidable in guides to and from the periphery of the bicycle-wheel having a yoke fixed at its lower end, a bell fixed within said yoke and a hammer or clapper fixed upon one end of a bell-crank lever which is fulcrumed to a stem within the bell, a wheel having one or more arms and a shaft journaled in vertical slots in the lower end of the yoke, so that it is movable upwardly when the yoke is depressed to bring it into contact with the bicycle wheel rim, the arms upon the opposite side from the wheel rim striking the other end of the bell crank lever whereby the hammer is caused to strike the bell.

3. A bell and brake attachment for bicycles consisting of a frame or yoke movable to or from the tire or periphery of the wheel having a wheel movably journaled in the lower end of the yoke and provided with one or more arms, a bell fixed above said wheel, a hammer upon a pivoted bell-crank lever so disposed that the oscillations of the lever will cause the hammer to strike the bell, the opposite arm of the lever forming a contact with the arms of the movable wheel so that when the yoke is depressed the wheel will be caused to rotate and its arms act to move the bell hammer, and a further depression of the wheel will lock the same against the tire and prevent its rotation so that it serves as a brake.

4. The combination with a vehicle wheel of a slidable plunger rod, a fork or yoke fixed to its lower end, an armed wheel movably journaled in the lower end of the yoke, and adapted to contact with the vehicle wheel when depressed or to be withdrawn therefrom, a bell having a screw shank passing up through the center by which it is removably fixed in the fork crown, and a bell crank lever, the angle of which is fulcrumed in the lower end of the bell holding shank, said lever having one end provided with a hammer and the other adapted to be moved by contact of the intermediate wheel with the vehicle wheel.

In witness whereof I have hereunto set my hand.

WILLIAM A. HAY.

Witnesses:
S. H. NOURSE,
JESSIE C. BRODIE.